(12) United States Patent
Niblock et al.

(10) Patent No.: US 7,444,042 B1
(45) Date of Patent: Oct. 28, 2008

(54) OPTICAL SWITCH

(75) Inventors: Trevor Niblock, Santa Clara, CA (US); Gerard Dirk Smits, Los Gatos, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 11/805,955

(22) Filed: May 25, 2007

(51) Int. Cl.
G02B 6/26 (2006.01)
G02B 6/42 (2006.01)
G02B 6/35 (2006.01)

(52) U.S. Cl. .............................. 385/16; 385/18; 385/19; 385/22

(58) Field of Classification Search ....................... None
See application file for complete search history.

(56) References Cited

U.S. PATENT DOCUMENTS

| | | | |
|---|---|---|---|
| 6,169,826 B1 * | 1/2001 | Nishiyama et al. ............ 385/22 |
| 6,360,036 B1 * | 3/2002 | Couillard ...................... 385/19 |
| 7,095,919 B2 * | 8/2006 | Kawamoto et al. ............ 385/18 |
| 2004/0022484 A1 * | 2/2004 | Sigloch et al. ................ 385/22 |
| 2005/0089298 A1 | 4/2005 | Maxwell et al. ............. 385/144 |

OTHER PUBLICATIONS

Gary D. Gray Jr. and Paul A. Kohl, "Magnetically Bistable Actuator Part 1. Ultra-Low Switching Energy And Modeling", Sensors and Actuators A: Physical, vol. 119, Issue 2, Apr. 13, 2005, pp. 489-501.

John A. Wright, et al., "Micro-Miniature Electromagnetic Switches Fabricated Using MEMS Technology", Proceedings: 46th Annual International Relay Conference: NARM '98, Oak Brook, Illinois, Apr. 1998, pp. 13-1 to 13-4.

Han S. Lee, et al., "Micro-Electro-Mechanical Relays—Design Concepts and Process Demonstrations", Joint 22nd International Conference on Electrical Contacts and 50th IEEE HOLM Conference on Electrical Contacts, Sep. 20-23, 2004, pp. 242-247.

J.H. Fabian, et al., "Maxtrix Combination of MEMS Relays", 17th IEEE International Conference on Micro Electro Mechanical Systems, 2004, pp. 861-864.

Ernst Thielicke and Ernst Obermeier, "A Fast Switching Surface Micromachined Electrostatic Relay", The 12th International Conference on Solid State Sensors, Actuators and Microsystems, Boston, Jun. 8-12, 2003, pp. 899-902.

Ren Wanbin, et al., "Finite Element Analysis of Magnetic Structures for Micro-Electro-Mechanical Relays",Proceedings of the 51st IEEE HOLM Conference on Electrical Contacts, Sep. 26-28, 2005, pp. 265-269.

John A. Wright, et al., "Magnetostatic MEMS Relays For The Miniaturization Of Brushless DC Motor Controllers", 12th IEEE International Conference on Micro Electro Mechanical Systems, Jan. 17-21, 1999, pp. 594-599.

(Continued)

*Primary Examiner*—Tina M Wong
(74) *Attorney, Agent, or Firm*—Mark C. Pickering (57) ABSTRACT

An optical switch is implemented with one or more cantilevered optical channels, which are formed in a flexible waveguide structure, and an actuator which is connected to the cantilevered optical channels, to position the cantilevered optical channels to direct an optical signal along one of a number of optical pathways.

19 Claims, 5 Drawing Sheets

OTHER PUBLICATIONS

U.S. Appl. No. 11/498,356, Payne, filed Aug. 2, 2006.

Nitto Denko/News Release, "Photo-Sensitive Epoxy Developed for Use in Optical Waveguides—Excellent Transparency, Flexibility, Manufacturability", [online], [retrieved on May 1, 2007]. Retrieved from the Internet: http://www.nitto.com/company/release/05_04_14/index.html., pp. 1-2.

Gary D. Gray Jr., et al. "Magnetically Bistable Actuator Part 2. Fabrication and Performance", Sensors and Actuators A: Physical, vol. 119, Issue 2, Apr. 13, 2005, pp. 502-511.

* cited by examiner

OPTICAL SWITCH

BACKGROUND OF THE INVENTION

1. Field of the Invention

The present invention relates to switches and, more particularly, to an optical switch.

2. Description of the Related Art

A switch is a well-known device that connects, disconnects, or changes connections between devices. An optical switch is a switch that directs incoming light energy along one of a number of optical pathways. Optical switches typically include an actuator, which is a well-known mechanical device that moves or controls a mechanical member to move or control the switch.

For example, an optical switch can be implemented with a mirror and an actuator that rotates the face of the mirror. In operation, when a beam of light is directed to the face of the mirror, the output path of the beam of light reflected off of the mirror changes directions as the face of the mirror is rotated.

One of the drawbacks of optical switches is that these types of switches tend to be expensive and difficult to manufacture. As a result, there is a need for an optical switch that is inexpensive and easy to manufacture.

BRIEF DESCRIPTION OF THE DRAWINGS

FIGS. 2A-5A and 2B-5B are a series of views illustrating an example of a method 200 of forming an optical switch in accordance with the present invention. FIGS. 2A-5A are plan views. FIGS. 2B-5B are cross-sectional views taken along lines 2B-2B through 5B-5B, respectively.

FIGS. 6A-6B are views illustrating an example of the operation of optical switch 232.

FIGS. 7A-9A and 7B-9B are a series of views illustrating an example of a method 700 of forming an optical switch in accordance with the present invention. FIGS. 7A-9A are plan views. FIGS. 7B-9B are cross-sectional views taken along lines 7B-7B through 9B-9B, respectively.

FIGS. 10A-10B are views illustrating an example of the operation of optical switch 732.

FIGS. 11A-11C and 12A-12B are a series of views illustrating an example of an optical switch system 1100 in accordance with the present invention. FIGS. 11A-12A are plan views.

DETAILED DESCRIPTION OF THE INVENTION

Figure 1A:
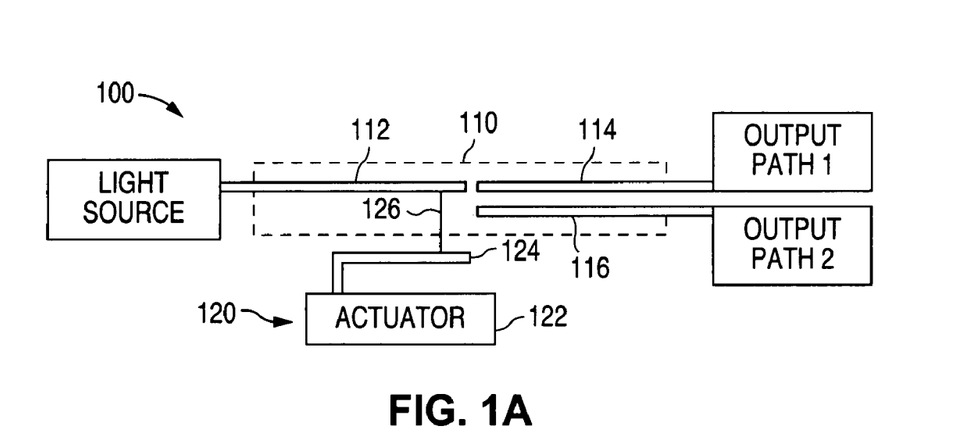
FIGS. 1A-1B are a series of views illustrating an example of an optical switch 100 in accordance with the present invention.
Figure 1B:
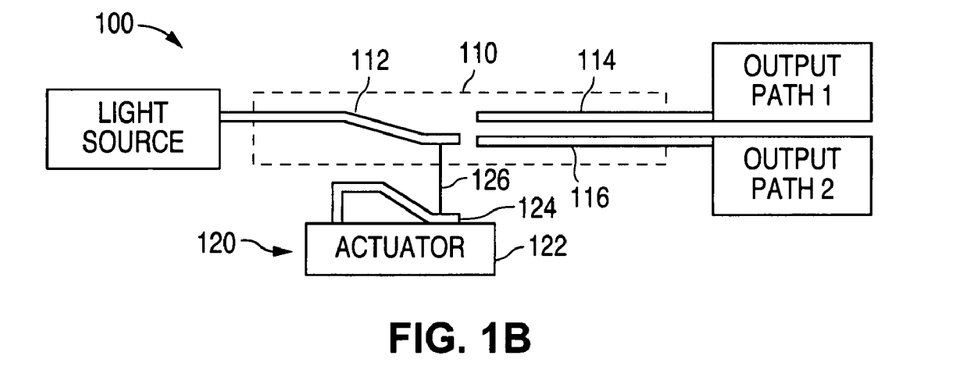

FIGS. 1A-1B show a series of views that illustrate an example of an optical switch 100 in accordance with the present invention. As described in greater detail below, a cantilevered optical channel is formed in a flexible waveguide structure, and positioned by an actuator to direct incoming light energy along one of a number of optical pathways.

As shown in FIG. 1A, optical switch 100 includes an optical waveguide structure 110 that has an input optical channel 112, a first output optical channel 114, and a second output optical channel 116. Waveguide structure 110 can be implemented with any conventional flexible optical waveguide.

As further shown in FIG. 1A, optical switch 100 also includes an actuator 120 that has a base member 122 and a cantilever member 124 that lies adjacent to base member 122. Actuator 120 can be implemented with any conventional actuator. For example, actuator 120 can be implemented as a micro-electromechanical system (MEMS) device. MEMS devices are micro-machines that are formed using the same deposition and etch steps that are used to fabricate conventional semiconductor devices.

Optical switch 100 further includes a connecting member 126 that connects cantilever member 124 to input optical channel 112. Connecting member 126 translates the motion of cantilever member 124 into the motion of input optical channel 112. Connecting member 126 can be implemented with a number of materials, such as a connecting rod or an adhesive material.

In operation, as shown in FIG. 1A, when cantilever member 124 of actuator 120 is in a rest or first position, input optical channel 112 and first output optical channel 114 are aligned so that an optical signal that flows into input optical channel 112 flows through and out of first output optical channel 114.

On the other hand, as shown in FIG. 1B, when actuator 120 has been energized, such as to generate a magnetic field, cantilever member 124 moves toward base member 122. As further shown in FIG. 1B, the movement of cantilever member 124 also moves input optical channel 112 to an energized or second position that is aligned with second output optical channel 116. In this position, an optical signal that flows into input optical channel 112 flows through and out of second output optical channel 116. Thus, by controlling the position of cantilever member 124, optical switch 100 can direct an optical signal along one of two optical pathways.

FIGS. 2A-5A and 2B-5B show a series of views that illustrate an example of a method 200 of forming an optical switch in accordance with the present invention. FIGS. 2A-5A show plan views, while FIGS. 2B-5B show cross-sectional views taken along lines 2B-2B through 5B-5B, respectively.

Method 200 begins by depositing a thin coating of a first photosensitive polymer material, which is in a liquid state, on a working surface such as a glass plate. Following this, the first photosensitive polymer material is exposed to a shadowed ultraviolet (UV) or other energetic light source. A shadowed light source is a masked light source that has transparent regions that pass light energy, and opaque regions that block light energy.

Figure 2A:
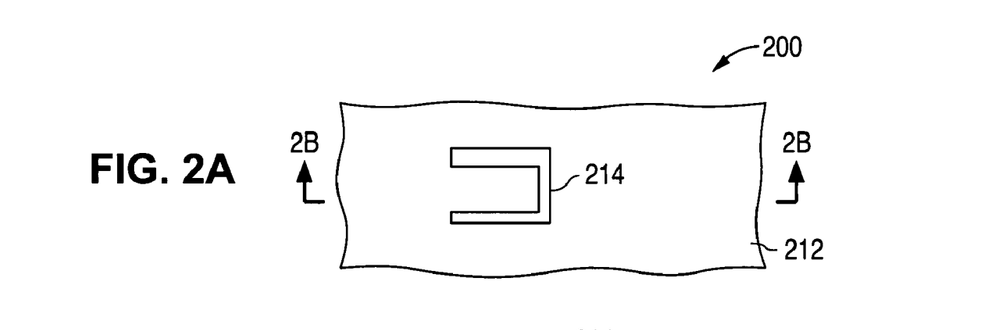
Figure 2B:
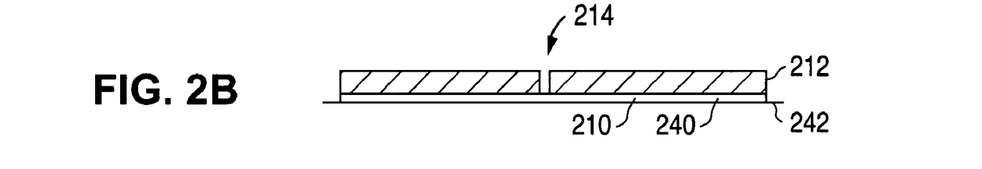

As shown in FIGS. 2A-2B, the light energy hardens all of the first photosensitive polymer material on a working surface 210, except for a U-shaped region, to form a first cladding layer 212. The U-shaped region is blocked from receiving light energy, and therefore remains unexposed. After exposure, the unexposed U-shaped region of the first photosensitive material (which did not receive any light energy and was not hardened) is then rinsed away to form a U-shaped opening 214 that extends through first cladding layer 212.

After first cladding layer 212 and U-shaped opening 214 have been formed, a second photosensitive polymer material is deposited on first cladding layer 212. The second photosensitive polymer material has an index of refraction which is higher than the index of refraction of the first photosensitive polymer material.

Figure 3A:
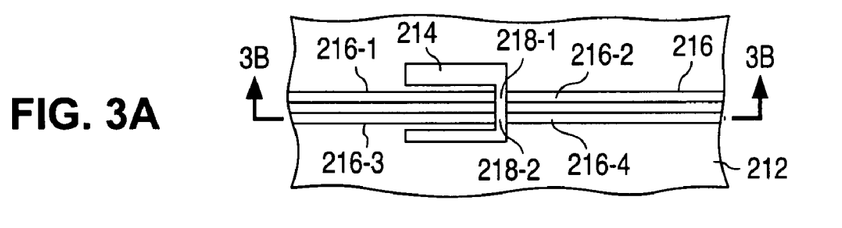
Figure 3B:
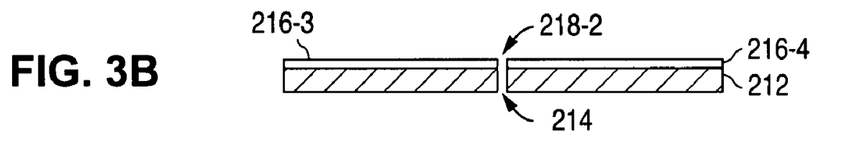

Following the deposition of the second photosensitive polymer material, the second photosensitive polymer material is exposed to a shadowed ultraviolet (UV) or other energetic light source. As shown in FIGS. 3A-3B, the light energy hardens a number of segmented regions of the second photosensitive polymer material to form a number of segmented optical channels 216 that sit on first cladding layer 212. The surrounding region is blocked from receiving light energy, and therefore remains unexposed. After exposure, the unexposed region of the second photosensitive material (which did not receive any light energy and was not hardened) is rinsed away.

In the example shown in FIGS. 3A-3B, the segmented optical channels 216 include a first input optical channel 216-1, a first output optical channel 216-2, and an opening 218-1 that lies between the ends of channels 216-1 and 216-2. In addition, the segmented optical channels 216 also include a second input optical channel 216-3, a second output optical channel 216-4, and an opening 218-2 that lies between the ends of channels 216-3 and 216-4.

After the segmented optical channels 216 have been formed, the first photosensitive polymer material is deposited on first cladding layer 212 and the segmented optical channels 216. Following this, the first photosensitive polymer material is exposed to a shadowed ultraviolet (UV) or other energetic light source.

Figure 4A:
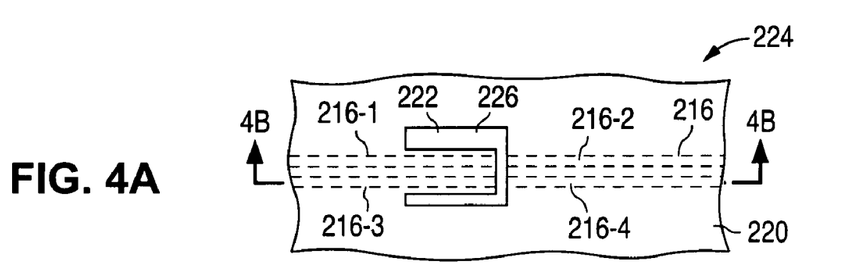
Figure 4B:
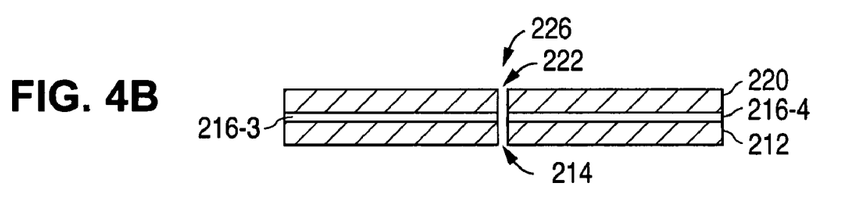

As shown in FIGS. 4A-4B, the light energy hardens all of the first photosensitive polymer material, except for a U-shaped region, to form a second cladding layer 220. The U-shaped region is blocked from receiving light energy, and therefore remains unexposed. After exposure, the unexposed U-shaped region of the first photosensitive material (which did not receive any light energy and was not hardened) is then rinsed away to form a U-shaped opening 222 that extends through second cladding layer 220.

First cladding layer 212, the segmented optical channels 216, and second cladding layer 220 define an optical waveguide structure 224. In accordance with the present invention, U-shaped opening 214 and U-shaped opening 222 are aligned with each other so that, along with opening 218-1 and opening 218-2, a U-shaped opening 226 extends through optical waveguide structure 224 to transform the ends of the input optical channels 216-1 and 216-3 into cantilevered structures.

Figure 5A:
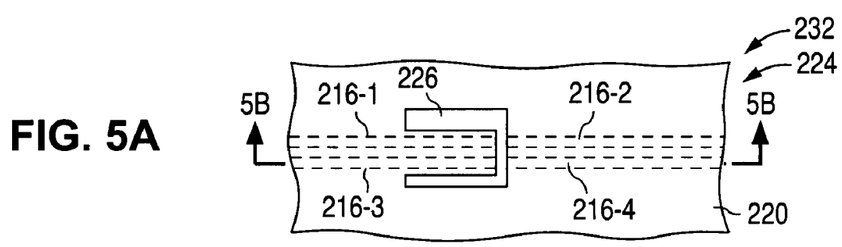
Figure 5B:
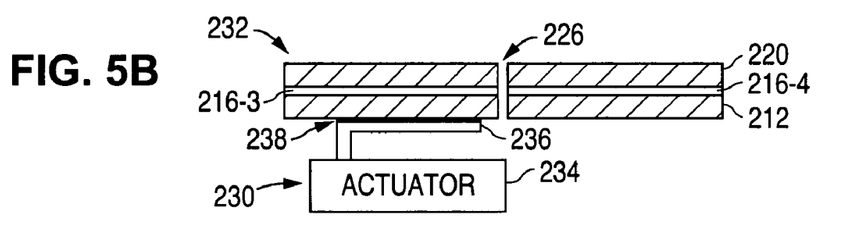

After optical waveguide structure 224 has been formed, as shown in FIGS. 5A-5B, an actuator 230 is attached to optical waveguide structure 224 to form an optical switch 232. For example, actuator 230 can be placed on optical waveguide structure 224 using a conventional pick-and-place machine. Optical waveguide structure 224 and actuator 230 can both include alignment marks which allow actuator 230 to be precisely positioned when being attached to optical waveguide structure 224.

Actuator 230 can alternately be placed on optical waveguide structure 224 using kinetic alignment. With kinetic alignment, the top surface of cantilever member 236 if formed with bumps and the bottom surface of optical waveguide structure 224 is formed with holes (or vice versa) so that a light vibration will cause the bumps to fall into the holes, thereby precisely positioning actuator 230 on optical waveguide structure 224.

Actuator 230 has a base member 234 and a cantilever member 236 that lies adjacent to base member 234. Cantilever member 236 is separated from base member 234 by an actuation gap that is equal to the channel-to-channel spacing between optical channels 216-1 and 216-3. In the present example, cantilever member 236, which provides horizontal motion, is attached via an adhesive 238 to the region of optical waveguide structure 224 that lies below the cantilevered ends of the input optical channels 216-1 and 216-3.

Actuator 230 can be implemented with, for example, actuator 100 described in application Seri. No. 11/805,934 for MEMS Actuator and Relay with Horizontal Actuation, filed on an even date herewith, and application Ser. No. 11/805,933 for Method of Forming a MEMS Actuator and Relay with Horizontal Actuation, filed on an even date herewith, which are both incorporated by reference.

Alternately, rather than applying adhesive 238 to the bottom surface of optical waveguide structure 224 (the bottom surface of first cladding layer 212) and then placing actuator 230 on adhesive 238, an adhesive strip 240 that includes a removable protective cover 242 can be utilized as the working surface 210 as shown in FIG. 2B. As a result, the bottom surface of first cladding layer 212 is formed on adhesive strip 240. In this case, after optical waveguide structure 224 has been formed, protective cover 242 is removed to expose adhesive strip 240, followed by the placement of actuator 230 on to adhesive strip 240.

In addition to method 200, a through-the-waveguide opening that is similar to opening 226 can alternately be formed by utilizing a lithographic process. For example, the light energy can harden all of the first photosensitive polymer material to form first cladding layer 212. The U-shaped opening 214 can then formed by masking and etching first cladding layer 212.

In addition, the light energy can harden all of the second photosensitive polymer material. The segmented optical channels 216 can then formed by masking and etching the hardened layer of second photosensitive polymer material. Further, the light energy can harden all of the third photosensitive polymer material to form second cladding layer 220. The U-shaped opening 222 is then formed by masking and etching second cladding layer 220. U.S. patent application Ser. No. 11/498,356 for "Apparatus and Method for a Singulation of Polymer Waveguides Using Photolithographcy," filed on Aug. 2, 2006, which is hereby incorporated by reference, discloses a method of lithographically forming a waveguide structure.

Further alternately, opening 226 in waveguide 224 can be formed using a precision cutting device, such as a laser, that cuts opening 226 through waveguide 224. In addition alternately, opening 226 in waveguide 224 can be formed in a lithographic process where opening 226 is formed with a single mask and etch.

In operation, as shown in FIGS. 5A-5B, when cantilever member 236 of actuator 230 is in a rest or first position, input optical channel 216-1 and output optical channel 216-2 are aligned so that an optical signal that flows into input optical channel 216-1 flows through and out of output optical channel 216-2. Similarly, input optical channel 216-3 and output optical channel 216-4 are aligned so that an optical signal that flows into input optical channel 216-3 flows through and out of output optical channel 216-4.

Figure 6A:
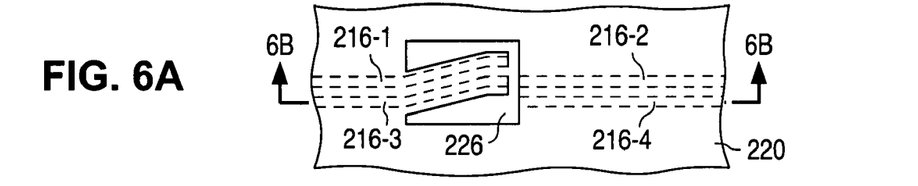
FIG. 6A is a plan view.
Figure 6B:
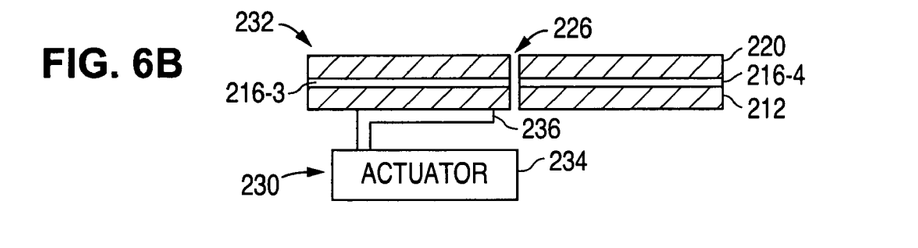
FIG. 6B is a cross-sectional view taken along lines 6B-6B of FIG. 6A.

On the other hand, when actuator 230 has been energized, such as to generate a magnetic field, cantilever member 236 moves horizontally towards base member 232 a fixed amount to close the actuation gap as shown in FIGS. 6A-6B. The horizontal movement of cantilever member 236 also horizontally moves the input optical channels 216-1 and 216-3 by the fixed amount to an energized or second position.

The horizontal movement of input optical channel 216-3 disconnects input optical channel 216-3 from output optical channel 216-4, and aligns input optical channel 216-3 with output optical channel 216-2. In this position, an optical signal that flows into input optical channel 216-3 flows through and out of output optical channel 216-2. In addition, the horizontal movement of input optical channel 216-1 disconnects input optical channel 216-1 from output optical channel 216-2.

FIGS. 7A-9A and 7B-9B show a series of views that illustrate an example of a method 700 of forming an optical switch in accordance with the present invention. FIGS. 7A-9A show plan views, while FIGS. 7B-9B show cross-sectional views taken along lines 7B-7B through 9B-9B, respectively.

Figure 7A:
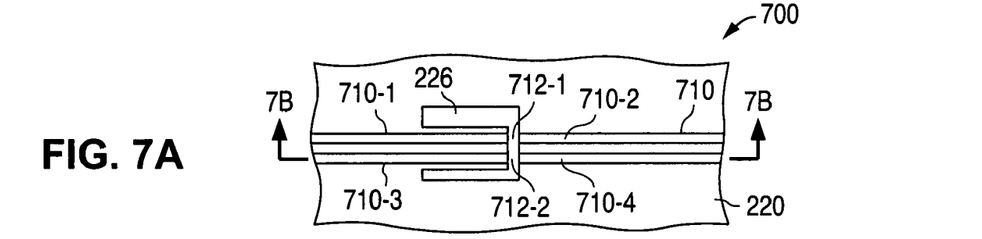
Figure 7B:
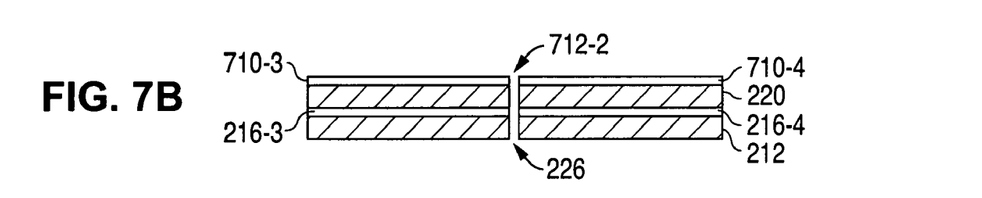

As shown in FIGS. 7A-7B, method 700 includes all of the steps of method 200 up through the formation of second cladding layer 220 and U-shaped opening 222 shown in FIGS. 4A-4B. After second cladding layer 220 and U-shaped opening 222 have been formed, the second photosensitive polymer material is deposited on second cladding layer 220.

Following the deposition of the second photosensitive polymer material, the second photosensitive polymer material is exposed to a shadowed ultraviolet (UV) or other energetic light source. As shown in FIGS. 7A-7B, the light energy hardens a number of segmented regions of the second photosensitive polymer material to form a number of segmented optical channels 710 that sit on second cladding layer 220. The surrounding region is blocked from receiving light energy, and therefore remains unexposed. After exposure, the unexposed region of the second photosensitive material (which did not receive any light energy and was not hardened) is rinsed away.

In the example shown in FIGS. 7A-7B, the segmented optical channels 710 include a first input optical channel 710-1, a first output optical channel 710-2, and an opening 712-1 that lies between the ends of channels 710-1 and 710-2. In addition, the segmented optical channels 710 also include a second input optical channel 710-3, a second output optical channel 710-4, and an opening 712-2 that lies between the ends of channels 710-3 and 710-4.

After the segmented optical channels 710 have been formed, the first photosensitive polymer material is deposited on second cladding layer 220 and the segmented optical channels 710. Following this, the first photosensitive polymer material is exposed to a shadowed ultraviolet (UV) or other energetic light source.

Figure 8A:
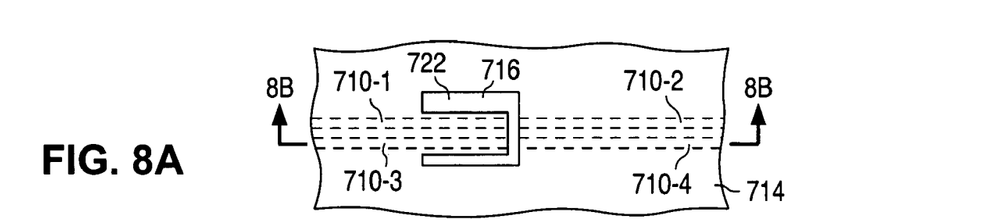
Figure 8B:
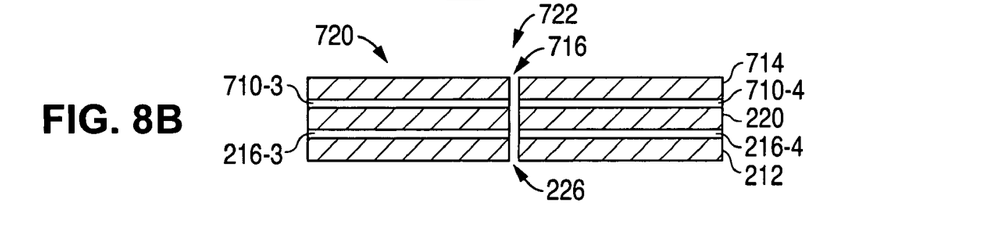

As shown in FIGS. 8A-8B, the light energy hardens all of the first photosensitive polymer material, except for a U-shaped region, to form a third cladding layer 714. The U-shaped region is blocked from receiving light energy, and therefore remains unexposed. After exposure, the unexposed U-shaped region of the first photosensitive material (which did not receive any light energy and was not hardened) is then rinsed away to form a U-shaped opening 716 that extends through third cladding layer 714.

First cladding layer 212, the segmented optical channels 216, second cladding layer 220, the segmented optical channels 710, and third cladding layer 714 define an optical waveguide structure 720. In accordance with the present invention, U-shaped opening 214, U-shaped opening 222, and U-shaped opening 716 are aligned with each other so that, along with opening 218-1, opening 218-2, opening 712-1, and opening 712-2, a U-shaped opening 722 extends through optical waveguide structure 720 to transform the ends of the input optical channels 216-1, 216-3, 710-1, and 710-3 into cantilevered structures.

Figure 9A:
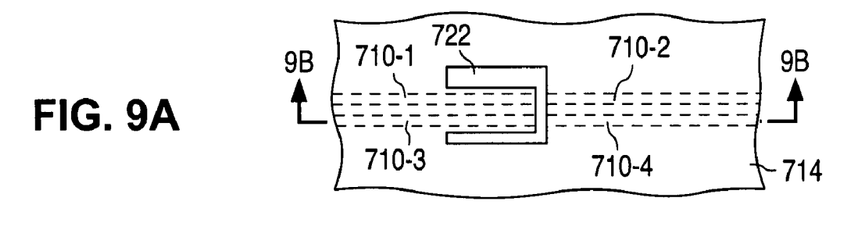
Figure 9B:
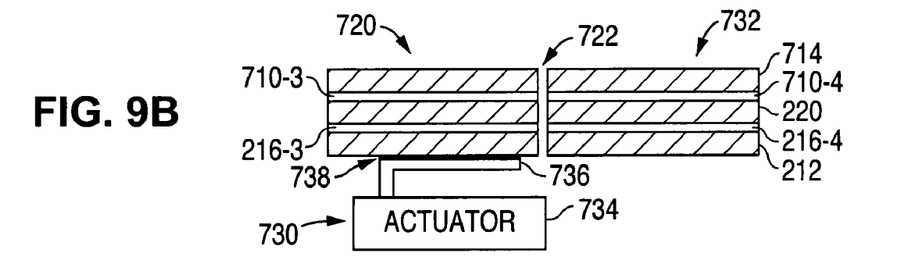

After optical waveguide structure 720 has been formed, as shown in FIGS. 9A-9B, an actuator 730 is attached to optical waveguide structure 720 to form an optical switch 732. For example, actuator 730 can be placed on optical waveguide structure 720 using a conventional pick-and-place machine. Optical waveguide structure 720 and actuator 730 can both include alignment marks which allow actuator 730 to be precisely positioned when being attached to optical waveguide structure 720.

Actuator 730 can alternately be placed on optical waveguide structure 720 using kinetic alignment. With kinetic alignment, the top surface of cantilever member 736 if formed with bumps and the bottom surface of optical waveguide structure 720 is formed with holes (or vice versa) so that a light vibration will cause the bumps to fall into the holes, thereby precisely positioning actuator 730 on optical waveguide structure 720.

Actuator 730 has a base member 734 and a cantilever member 736 that lies adjacent to base member 734. Cantilever member 736 is separated from base member 734 by an actuation gap that is equal to the channel-to-channel spacing between optical channels 216-1 and 710-1. In the present example, cantilever member 736, which provides vertical motion, is attached via an adhesive 738 to the region of optical waveguide structure 720 that lies below the cantilevered ends of the input optical channels 216-1 and 216-3.

Actuator 730 can be implemented with, for example, actuator 100 described in application Ser. No. 11/807,162 for MEMS Actuator and Relay with Vertical Actuation, filed on an even date herewith, and application Ser. No. 11/807,161 for Method of Forming a MEMS Actuator and Relay with Vertical Actuation, filed on an even date herewith, which are both incorporated by reference.

Alternately, rather than applying adhesive 738 to the bottom surface of optical waveguide structure 720 (the bottom surface of first cladding layer 212) and then placing actuator 730 on adhesive 738, the bottom surface of first cladding layer 212 can be formed on adhesive strip 240 as shown in FIG. 2B. In this case, after optical waveguide structure 720 has been formed, protective cover 742 is removed to expose adhesive strip 740, followed by the placement of actuator 730 on to adhesive strip 240.

In addition to method 700, a through-the-waveguide opening that is similar to U-shaped opening 722 can alternately be formed by utilizing a layer-by-layer lithographic process in the same manner as described above, a precision cutting device, such as a laser, or a lithographic process that forms U-shaped opening 722 with a single mask and etch.

In operation, as shown in FIGS. 9A-9B, when cantilever member 736 of actuator 730 is in a rest or first position, input optical channel 710-1 and output optical channel 710-2 are aligned so that an optical signal that flows into input optical channel 710-1 flows through and out of output optical channel 710-2. Further, input optical channel 710-3 and output optical channel 710-4 are aligned so that an optical signal that flows into input optical channel 710-3 flows through and out of output optical channel 710-4.

In addition, input optical channel 216-1 and output optical channel 216-2 are aligned so that an optical signal that flows into input optical channel 216-1 flows through and out of output optical channel 216-2. Similarly, input optical channel 216-3 and output optical channel 216-4 are aligned so that an optical signal that flows into input optical channel 216-3 flows through and out of output optical channel 216-4.

Figure 10A:
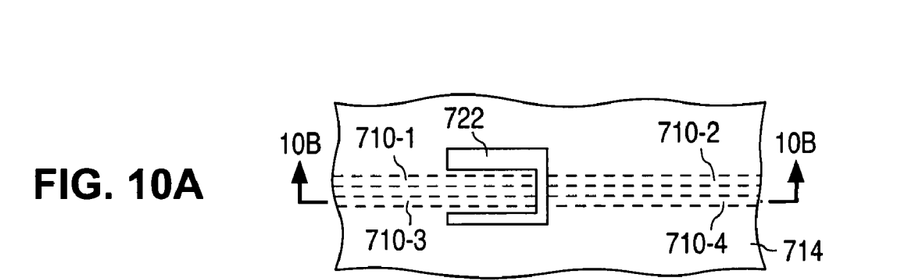
FIG. 10A is a plan view.
Figure 10B:
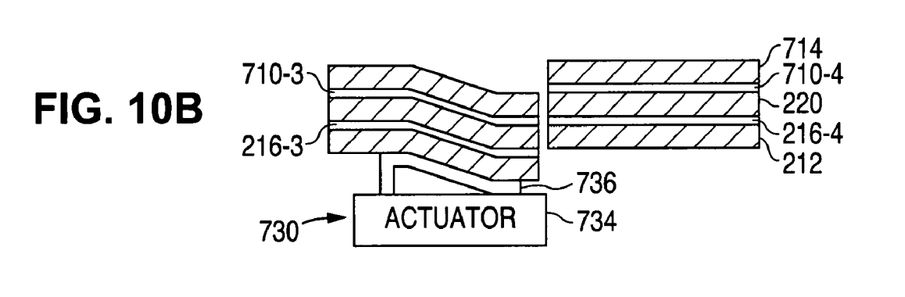
FIG. 10B is a cross-sectional view taken along lines 10B-10B of FIG. 10A.

On the other hand, when actuator 730 has been energized, such as to generate a magnetic field, cantilever member 736 moves vertically towards base member 734 a fixed amount to close the actuation gap as shown in FIGS. 10A-10B. The vertical movement of cantilever member 736 also vertically moves the input optical channels 216-1, 216-3, 710-1, and 710-3 by the fixed amount to an energized or second position.

The vertical movement of input optical channel 710-1 disconnects input optical channel 710-1 from output optical channel 710-2, and aligns input optical channel 710-1 with output optical channel 216-2. In this position, an optical signal that flows into input optical channel 710-1 flows through and out of output optical channel 216-2. Further, the vertical movement of input optical channel 216-1 disconnects input optical channel 216-1 from output optical channel 216-2.

In addition, the vertical movement of input optical channel 710-3 disconnects input optical channel 710-3 from output optical channel 710-4, and aligns input optical channel 710-3 with output optical channel 216-4. In this position, an optical signal that flows into input optical channel 710-3 flows through and out of output optical channel 216-4. Further, the vertical movement of input optical channel 216-3 disconnects input optical channel 216-3 from output optical channel 216-4.

Figure 11A:
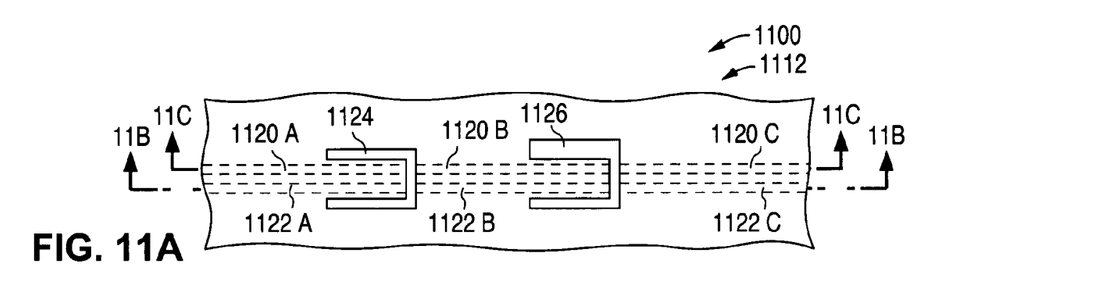
Figure 11B:
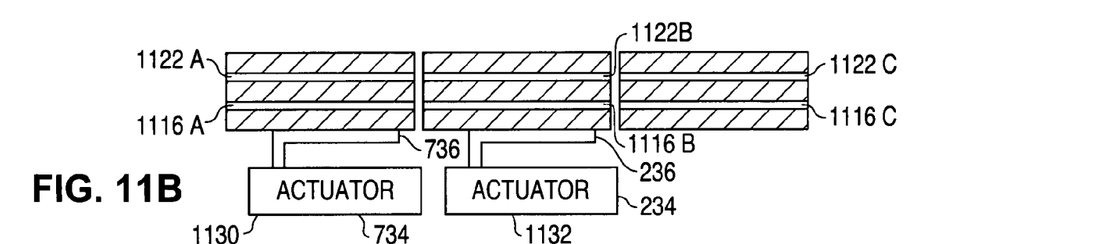
FIGS. 11B and 11C are cross-sectional views taken along lines 11B-11B and 11C-11C of FIG. 11A, respectively.
Figure 11C:
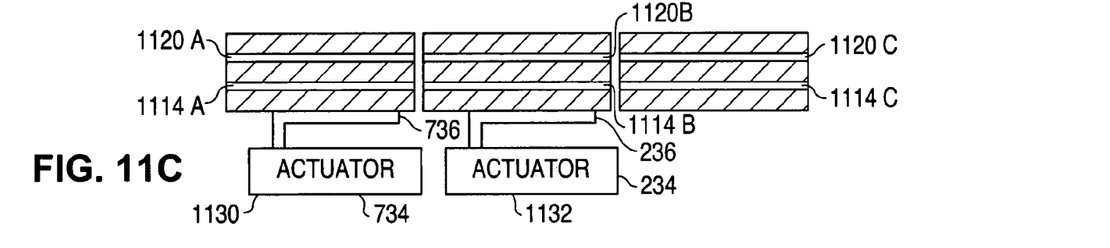
Figure 12A:
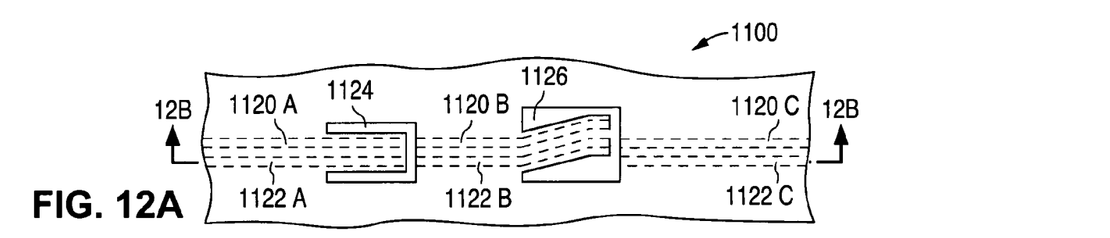
Figure 12B:
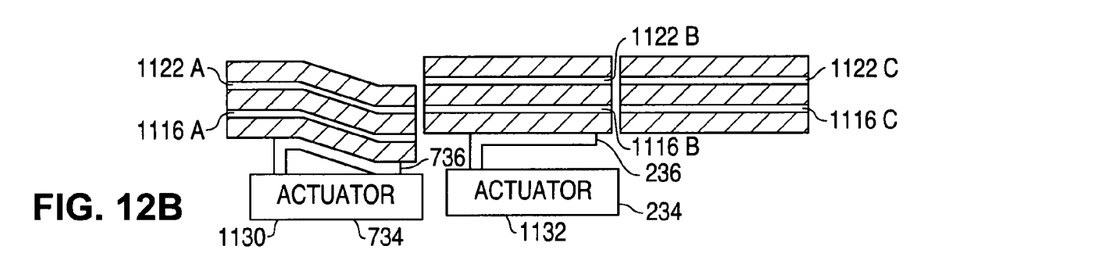
FIG. 12B is a cross-sectional view taken along line 12B-12B of FIG. 12A.

FIGS. 11A-11C and 12A-12B show a series of views that illustrate an example of an optical switch system 1100 in accordance with the present invention. FIGS. 11A-12A show plan views, FIGS. 11B-11C show cross-sectional views taken along lines 11B-11B and 11C-11C of FIG. 11A, respectively, and FIG. 12B shows a cross-sectional view taken along line 12B-12B of FIG. 12A.

As shown in FIGS. 11A-11B, optical switch system 1100 includes a flexible optical waveguide structure 1112 that includes a number of optical channels that lie in a number of levels. In the present example, the optical channels include an input channel 1114A, an intermediate channel 1114B, and an output channel 1114C; and an input channel 1116A, an intermediate channel 1116B, and an output channel 1116C. The optical channels also include an input channel 1120A, an intermediate channel 1120B, and an output channel 1120C; and an input channel 1122A, an intermediate channel 1122B, and an output channel 1122C.

Further, optical waveguide structure 1112 has been formed in accordance with the present invention to have a U-shaped opening 1124 and a U-shaped opening 1126 that both extend completely through optical waveguide structure 1112. U-shaped opening 1124 is similar to U-shaped opening 722, while U-shaped opening 1126 is similar to U-shaped opening 226.

U-shaped opening 1124 differs from U-shaped opening 722 in that U-shaped opening 1124 has arms with equal widths, while U-shaped opening 722 has arms with different widths. U-shaped opening 1124 has arms with equal widths because only vertical motion is present. As a result, U-shaped opening 722 can alternately be formed to have arms with equal widths.

In addition, optical switch system 1100 includes a vertical actuator 1130 and a horizontal actuator 1132 that are attached to optical waveguide structure 1112. Vertical actuator 1130 can be implemented with, for example, actuator 730, while horizontal actuator 1132 can be implemented with, for example, actuator 230. As a result, actuators 1130 and 1132 are connected the same as actuators 230 and 730, respectively, and use the same reference numerals as actuators 230 and 730, respectively, to designate the structures which are common to both actuators.

In operation, as shown in FIGS. 11A-11C, when cantilever members 236 and 736 are in a rest or first position, optical channels 1122A, 1122B, and 1122C are aligned so that an optical signal that flows into optical channel 1122A flows through and out of optical channel 1122C. However, by selectively activating actuators 1130 and 1132, an optical signal flowing into optical channel 1122A can be directed to a number of different output optical channels.

For example, by activating only actuator 1132, an optical signal flowing into optical channel 1122A and through optical channel 1122B can be directed to output optical channel 1120C. Similarly, by activating only actuator 1130, an optical signal flowing into optical channel 1116A can be directed to intermediate optical channel 1116B and then to output optical channel 1116C. Further, as shown in FIGS. 12A-12B, by activating both actuators 1130 and 1132, an optical signal flowing into optical channel 1122A can be directed to output optical channel 1114C.

Optical waveguide structure 1112 is illustrated with four optical channels that each has three sections (input channel section, intermediate channel section, and output channel section) for purposes of clarity, and can include tens to hundreds to thousands of channels and sections. In addition, optical switch system 1100 is illustrated with two actuators for clarity, and can include tens to hundreds to thousands of actuators.

When multiple actuators are utilized, the multiple actuators can be formed on a single chip, and attached to optical waveguide structure 1112 at the same time. As a result, the time required to precisely place the actuators on the optical waveguide structure can be substantially reduced. For example, assume that a row of actuators is to be placed on the optical waveguide structure. The row of actuators, which are oriented in series as shown in FIG. 11 (or side-by-side instead of in series), has a first actuator, a number of intermediate actuators, and a last actuator. In this case, by precisely positioning the first actuator and the last actuator on the optical waveguide structure, the intermediate actuators are automatically precisely positioned because each of the actuators is aligned with each other on the single chip.

Therefore, in accordance with the present invention, even if the first and last actuators need to be precisely positioned by hand, hundreds of actuators can be attached to the optical waveguide structure in approximately the same amount of time that is required to attach two actuators (the first and the last in the row).

Thus, an optical switch and an optical switch structure have been described. One of the advantages of the present invention is that the optical switch of the present invention is inexpensive and easy to manufacture, requiring only the formation of openings in a flexible optical waveguide structure, and the attachment of a number of actuators.

It should be understood that the above descriptions are examples of the present invention, and that various alternatives of the invention described herein may be employed in practicing the invention. Thus, it is intended that the following claims define the scope of the invention and that structures and methods within the scope of these claims and their equivalents be covered thereby.

What is claimed is:

1. An optical switch comprising:
an optical waveguide structure having:
a first polymer material having a top surface and a bottom surface;
a plurality of strips of a second polymer material that form a plurality of optical channels, the first polymer material touching each strip of the second polymer material and isolating laterally adjacent strips of the second polymer material from each other, the plurality of optical channels including a first optical channel, a second optical channel, and a third optical channel; and
a U-shaped opening that extends through the first polymer material from the top surface of the first polymer material to the bottom surface of the first polymer material, the U-shaped opening exposing an end of the first optical channel, an end of the second optical channel, and an end of the third optical channel.

2. The optical switch of claim 1 wherein the U-shaped opening has a base section and a pair of arms that extend away from the base section, the base section of the U-shaped opening lying between the end of the first optical channel and the end of the second optical channel.

3. The optical switch of claim 2 and further comprising an actuator connected to the optical waveguide structure.

4. The optical switch of claim 3 wherein the U-shaped opening defines a cantilever structure that lies between the pair of arms.

5. The optical switch of claim 4 wherein the actuator has a base member and a cantilever member, the cantilever member having a first position and a second position, and touching the cantilever structure.

6. The optical switch of claim 5 wherein the first optical channel directs an optical signal to the second optical channel when the cantilever member is in the first position, and to the third optical channel when the cantilever member is in the second position.

7. The optical switch of claim 6 wherein the cantilever member moves vertically to move from the first position to the second position.

8. The optical switch of claim 6 wherein the cantilever member moves horizontally to move from the first position to the second position.

9. The optical switch of claim 6 wherein the optical waveguide structure includes a cladding material that contacts the plurality of optical channels.

10. The optical switch of claim 6 wherein the plurality of strips of the second polymer material are substantially parallel.

11. The optical switch of claim 2 and further comprising:
a first actuator connected to the optical waveguide structure, the first actuator lying below the first optical channel; and
a second actuator connected to the optical waveguide structure, the second actuator lying below the second optical channel.

12. The optical switch of claim 1 wherein the first polymer material isolates vertically adjacent strips of the second polymer material from each other.

13. The optical switch of claim 2 wherein the pair of arms of the U-shaped opening extend along a length of the first optical channel.

14. An optical waveguide structure comprising:
a first polymer material having a top surface and a bottom surface;
a plurality of strips of a second polymer material that form a plurality of optical channels, the first polymer material touching each strip of the second polymer material and isolating laterally adjacent strips of the second polymer material from each other, the plurality of optical channels including a first optical channel, a second optical channel, and a third optical channel; and
a U-shaped opening that extends through the first polymer material from the top surface of the first polymer material to the bottom surface of the first polymer material, the U-shaped opening exposing an end of the first optical channel, an end of the second optical channel, and an end of the third optical channel.

15. The optical switch of claim 14 wherein the U-shaped opening has a base section and a pair of arms that extend away from the base section, the base section of the U-shaped opening lying between the end of the first optical channel and the end of the second optical channel.

16. The optical switch of claim 15 wherein the pair of arms of the U-shaped opening extend along a length of the first optical channel.

17. The optical switch of claim 15 wherein the pair of arms of the U-shaped opening define a cantilever structure that lies between the pair of arms.

18. The optical switch of claim 15 wherein the first polymer material isolates vertically adjacent strips of the second polymer material from each other.

19. The optical switch of claim 15 wherein the optical waveguide structure includes a cladding material that contacts the plurality of strips of a second polymer material.

* * * * *